(12) United States Patent
Kim et al.

(10) Patent No.: US 10,228,834 B2
(45) Date of Patent: Mar. 12, 2019

(54) SYNCHRONIZED PRESENTATION OF DATA IN DIFFERENT REPRESENTATIONS

(71) Applicant: SAP SE, Walldorf (DE)

(72) Inventors: DongYoung Kim, Seoul (KP); Mincheol Lee, Seongnam (KP); Yong Sik Lee, Yong-in (KP); Johannes Osterhoff, Gwangmyeong (KP)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 15/347,351

(22) Filed: Nov. 9, 2016

(65) Prior Publication Data

US 2018/0129401 A1    May 10, 2018

(51) Int. Cl.
| | |
|---|---|
| *G06F 3/048* | (2013.01) |
| *G06F 3/0484* | (2013.01) |
| *G06F 3/0482* | (2013.01) |
| *G06T 11/20* | (2006.01) |
| *G06T 11/60* | (2006.01) |

(52) U.S. Cl.
CPC ........ *G06F 3/04845* (2013.01); *G06F 3/0482* (2013.01); *G06T 11/206* (2013.01); *G06F 2203/04803* (2013.01); *G06T 11/60* (2013.01)

(58) Field of Classification Search
CPC .................................................. G06F 17/30554
See application file for complete search history.

(56) References Cited

U.S. PATENT DOCUMENTS

| | | | |
|---|---|---|---|
| 9,378,233 B2 | 6/2016 | Lee et al. | |
| 2012/0143849 A1* | 6/2012 | Wong | G06F 17/30383 707/722 |

OTHER PUBLICATIONS

Brink, How to Turn the Details Pane on or Off in Windows 7, Jun. 2, 2010, https://www.sevenforums.com/tutorials/61507-details-pane-turn-off.html.*

* cited by examiner

*Primary Examiner* — Jeffrey A Gaffin
*Assistant Examiner* — Mohamed Abou El Seoud
(74) *Attorney, Agent, or Firm* — Fish & Richardson P.C.

(57) ABSTRACT

A horizontal toolbar presents a hierarchical path terminating at a currently-selected element, beginning at a root element, and including intermediate elements from a hierarchically-related subset of elements having parent-child relationships. A tree representation, provided simultaneously with the horizontal toolbar, includes nodes matching the elements included in the hierarchical path. The tree representation uses branches connecting adjacent parent-child nodes to indicate parent-child relationships and highlights a current node-of-interest in relation to other displayed nodes and matching the currently-selected element in the horizontal toolbar. A side panel, provided simultaneously with the horizontal toolbar and tree representation, presents side panel entries corresponding to elements displayed in the hierarchical path and nodes displayed in the tree representation, and identifies a currently-selected entry matching the currently-selected element in the horizontal toolbar and the current node-of-interest in the tree representation. Updates in one area automatically update the other areas.

20 Claims, 3 Drawing Sheets

```
┌─────────────────────────────────────────────────────────────────────────────────┐
│   Provide, for display in a first area of a user interface, a horizontal toolbar presenting a hierarchical path  │
│  terminating at a currently-selected element, the hierarchical path beginning at a root element and including    │
│   intermediate elements from a hierarchically-related subset of elements related by parent-child relationships   │
│     indicated in the hierarchical path using a left-to-right placement of adjacent parent and child element 202  │
└─────────────────────────────────────────────────────────────────────────────────┘
                                              │
                                              ▼
┌─────────────────────────────────────────────────────────────────────────────────┐
│  Provide, for display in a second area of the user interface and presented simultaneously with the horizontal    │
│    toolbar, a tree representation including nodes matching the elements included in the hierarchical path and    │
│        including the currently-selected element, the tree representation using branches connecting adjacent      │
│      parent-child nodes to indicate parent-child relationships, the tree representation highlighting a current   │
│    node-of-interest in relation to other displayed nodes, the current node-of-interest matching the currently-   │
│                            selected element in the horizontal toolbar 204                                        │
└─────────────────────────────────────────────────────────────────────────────────┘
                                              │
                                              ▼
┌─────────────────────────────────────────────────────────────────────────────────┐
│     Provide, for display in a third area of the user interface and presented simultaneously with the horizontal  │
│    toolbar and the tree representation, a side panel presenting side panel entries corresponding to elements     │
│   displayed in the hierarchical path and nodes displayed in the tree representation, the side panel identifying  │
│   a currently-selected entry matching the currently-selected element in the horizontal toolbar and the current   │
│                            node-of-interest in the tree representation 206                                       │
└─────────────────────────────────────────────────────────────────────────────────┘
                                              │
                                              ▼
┌─────────────────────────────────────────────────────────────────────────────────┐
│   Receive, using the user interface, user inputs within a currently-active area of the first area, the second    │
│                                     area, and the third area 208                                                 │
└─────────────────────────────────────────────────────────────────────────────────┘
                                              │
                                              ▼
┌─────────────────────────────────────────────────────────────────────────────────┐
│  Automatically update, based on the received user inputs, inactive areas of the first area, the second area,    │
│                                      and the third area 210                                                      │
└─────────────────────────────────────────────────────────────────────────────────┘
```

SYNCHRONIZED PRESENTATION OF DATA IN DIFFERENT REPRESENTATIONS

BACKGROUND

Information that is provided to users in user interfaces can be provided in various ways. For example, the information can be provided in textual form, table form, or graphically, and relationships among data elements can be indicated in various ways. User updates to, or selection from, the information can be made based on the hierarchical relationships.

SUMMARY

The present disclosure describes methods and systems, including computer-implemented methods, computer program products, and computer systems for providing information in various ways, specifically in different views of the same information.

In an implementation, a horizontal toolbar presents, in a first area of a user interface, a hierarchical path terminating at a currently-selected element, beginning at a root element, and including intermediate elements from a hierarchically-related subset of elements having parent-child relationships. A tree representation, provided in a second area of the user interface and provided simultaneously with the horizontal toolbar, includes nodes matching the elements included in the hierarchical path. The tree representation uses branches connecting adjacent parent-child nodes to indicate parent-child relationships and highlights a current node-of-interest in relation to other displayed nodes and matching the currently-selected element in the horizontal toolbar. A side panel, provided in a third area of the user interface and provided simultaneously with the horizontal toolbar and tree representation, presents side panel entries corresponding to elements displayed in the hierarchical path and nodes displayed in the tree representation, and identifies a currently-selected entry matching the currently-selected element in the horizontal toolbar and the current node-of-interest in the tree representation. Using the user interface, user inputs within a currently-active area of the first area, the second area, and the third area are received. Based on the received user inputs, inactive areas of the first area, the second area, and the third area are automatically updated.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, users are provided with an advantage of a visual overview on all the solutions available in a huge knowledge base that provides insights on the state, trend, structure, popularity, and different levels of importance of displayed nodes. Second, users can quickly browse through a data-set and identify an appropriate solution to a specific problem by means of a synced view between a visual representation and textual details. Third, users can add solutions to the data-set in a collaborative and simple way. Fourth, different levels of detail are provided in node representations at different zoom levels. For example, the complexity of the representation can be varied by the user, and the cognitive demand for users can be reduced. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 2 is a flowchart of an example method for displaying different representations of data, according to an implementation.

Like reference numbers and designations in the various drawings indicate like elements.

DETAILED DESCRIPTION

The following detailed description describes techniques for presenting information and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

Figure 1:
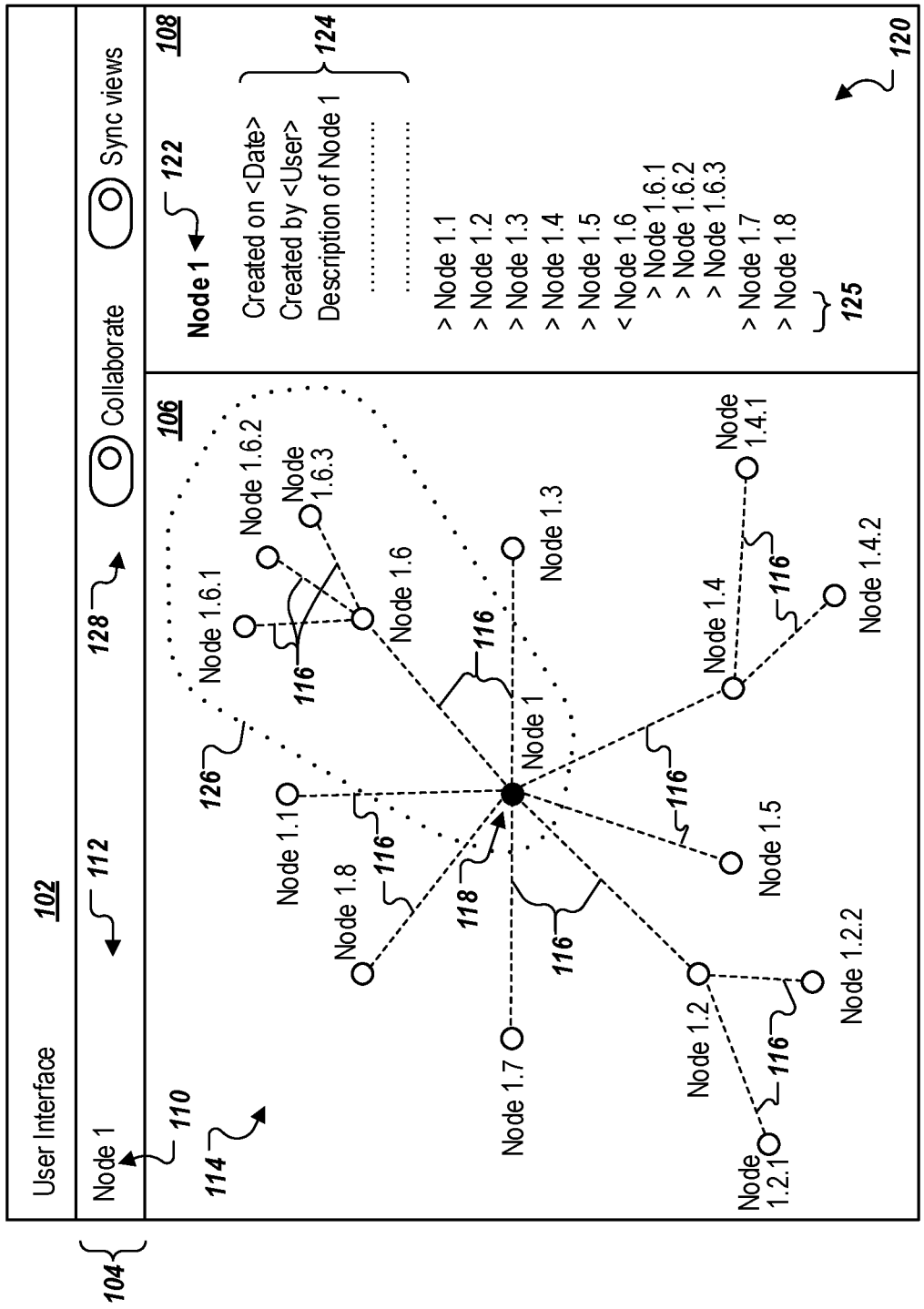
FIG. 1 is a screenshot of an example user interface that includes different areas for presenting similar information in different ways, according to an implementation.

FIG. 1 is a screenshot 100 of an example user interface 102 that includes different areas for presenting similar information in different ways. For example, the user interface 102 can be used to simultaneously present hierarchically-related information using a breadcrumb trail, a tree representation, and a side panel, though other display representations are possible. The breadcrumb trail can indicate a user's navigation, for example, on the Web or among a collection of hierarchically-related options or elements. The tree representation, for example, can identify relationships among nodes in the tree, including a root node, intermediate nodes, and leaf nodes, together indicating possible paths to select particular information. The side panel, for example, can indicate similar information as in the breadcrumb trail and the tree representation, but can use indentation to indicate hierarchical relationships and can include, or provide access to, detailed information to entries in the side panel that match or correspond to elements in the breadcrumb trail and nodes in the tree representation.

A horizontal toolbar 104, for example, can serve as a breadcrumb trail for displaying and facilitating selection among elements, sub-elements, and so on, starting at a root element 110 such as Node 1. At the same time, a currently-selected element 112 can be displayed during the selection process. Initially, the currently-selected element 112 can be the root element 110, such as before specific user selections are made. For example, selecting the root element 104a can cause the user interface 102 to display sub-elements of the root element 110. The sub-elements can be related to the root element 104a, for example, by parent-child relationships (or by other relationships). In some implementations, user-selectable sub-elements, such as for the root element 110, can be displayed in a popup or in another control. For example, the sub-elements of Node 1 from which a user can make a selection can include Node 1.1, Node 1.2, Node 1.3, Node 1.4, Node 1.5, Node 1.6, Node 1.7, Node 1.8. While information is displayed and selections are made in the horizontal toolbar 104, matching updates can be made simultaneously to presented information in a tree representation 106 and a side panel 108, as will described in more detail below.

In the horizontal toolbar 104, if sub-element Node 1.6 is selected, for example, then the currently-selected element 112 that is displayed can be updated to show, for example, Node 1>Node 1.6, meaning that the Node 1.6 element has been selected from the Node 1 element. Sub-elements of Node 1.6 can then be presented, such as in a popup that includes sub-elements 1.6.1, 1.6.2 and 1.6.3. If the sub-element 1.6.2 is selected, for example, then the currently-selected element 112 that is displayed can indicate Node 1>Node 1.6>Node 1.6.2. As another example involving hierarchical-related elements, possible currently-selected elements 112 can be fish>trout>rainbow trout, or in an example related to cars, make>model>year. Hierarchies involving more than three levels are possible.

The tree representation 106 can be presented simultaneously with the other areas, including the horizontal toolbar 104 and side panel 108, and updated automatically based on updates that occur in the other areas. The tree representation 106 can include, for example, nodes 114 that match the elements in the horizontal toolbar 104 and entries in the side panel 108. The tree representation 106 can use branches, such as connections 116, to connect adjacent parent-child nodes 114 and to indicate parent-child relationships, such as between Node 1 and Node 1.6, among other children nodes of Node 1. The tree representation 106 can highlight a current node-of-interest 118 in relation to other displayed nodes 114. For example, the current node-of-interest 118 can match the currently-selected element 112 in the horizontal toolbar 104.

The side panel 108 can be presented simultaneously with the horizontal toolbar 104 and the tree representation 106. The side panel 108 can include side panel entries 120 that correspond to elements displayed in the horizontal toolbar 104 and nodes 114 displayed in the tree representation 106. The side panel 108 can identify a currently-selected entry 122 that matches the currently-selected element 112 in the horizontal toolbar 104 and the current node-of-interest 118 in the tree representation 106. Initially, before a selection has been made from Node 1, the root node of the horizontal toolbar 104 and a starting point for selecting an option or a topic, for example, the currently-selected entry 122 can be Node 1. The currently-selected entry 122 can be highlighted, for example, and other side panel entries 120, including sub-entries to Node 1, can be included in the side panel 108.

Any area in the user interface 102 in which the user is working can be considered an active area. As user inputs are received within a currently-active area of the horizontal toolbar 104, the tree representation 106, and the side panel 108, the other areas can be updated automatically. For example, a selection of a sub-element from the horizontal toolbar 104 in order to designate a new currently-selected element 112 can cause a change in the display of nodes 114 in the tree representation 106 and can also change the display of side panel entries 120 in the side panel 108. For example, a different current node-of-interest 118 can be indicated, such as using highlighting, in relation to other displayed nodes 114, and a different side panel entry 120 can be highlighted, indicating a change in the currently-selected entry 122. In some implementations, automatic updates can be delayed, such as explicitly by the user, as described below.

FIG. 2 is a flowchart of an example method 200 for displaying different representations of data, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, a horizontal toolbar is provided for display in a first area of a user interface. For example, the user interface 102 can include the horizontal toolbar 104. The horizontal toolbar presents a hierarchical path terminating at a currently-selected element. For example, the horizontal toolbar 104 can include the currently-selected element 112 that initially is Node 1 and can change based on user input using the horizontal toolbar 104. The hierarchical path begins at a root element and includes intermediate elements from a hierarchically-related subset of elements. For example, Node 1 is the root element of the currently-selected element 112. If the currently-selected element 112 later becomes Node 1.6.2, for example, then Node 1.6 is an intermediate node and Node 1.6.2 is the currently-selected element 112 at which the path terminates. The elements are related by parent-child relationships indicated in the hierarchical path using a left-to-right placement of adjacent parent and child elements. For example, if the path includes Node 1>Node 1.6>Node 1.6.2, then Node 1.6 is a child of parent Node 1, and Node 1.6.2 is a child of parent Node 1.6. From 202, method 200 proceeds to 204.

At 204, a tree representation is provided for display in a second area of the user interface and presented simultaneously with the horizontal toolbar. For example, the user interface 102 can include the tree representation 106. The tree representation includes nodes matching the elements included in the hierarchical path, including the currently-selected element. For example, the tree representation 106 includes the nodes 114, including the current node-of-interest 118 that matches the currently-selected element 112. The tree representation uses branches connecting adjacent parent-child nodes to indicate parent-child relationships. For example, connections 116, shown as branches in the tree of the tree representation 106, are used to connect adjacent nodes 114 that have parent-child relationships, such as Node 1 to Node 1.6. The tree representation highlights a current node-of-interest in relation to other displayed nodes, and the current node-of-interest matches the currently-selected element in the horizontal toolbar. For example, the current node-of-interest 118 can be bolded in the tree representation 106 and matches the currently-selected element 112. From 204, method 200 proceeds to 206.

In some implementations, the tree representation 106 can be a radial tree visualization, such as with the root node of the tree at the center, and branches of the tree extending out, much like how the nodes 114 are shown in FIG. 2. In some implementations, the tree representation 106 can be represented as a tree in a different arrangement, such as a tree that includes the root node at the top of the tree representation 106, in which related nodes 114 are shown below the root node, and so on. In some implementations, the default tree representation 106 is a radial tree visualization, but can be changed by the user. For example, using controls in the user interface 102, the user can provide a user input specifying that a different tree representation is to be used, such as a horizontal tree, a vertical tree, a tree map, or an icicle chart. In response to the provided user input, the tree representation to match the specified different tree representation.

In some implementations, nodes 114 presented in the tree representation 106 can be displayed using different node representations for different levels. For example, instead of displaying the sub-nodes of a given node 114, the given node 114 can be displayed using a different symbol, such as indicating expandability. In another example, the given node 114 can include a label that indicates a number of corresponding sub-nodes, such as a label indicating that three sub-nodes exist for Node 1.6 if the node's sub-nodes are not yet displayed.

In some implementations, the method 200 can further include labeling nodes 114 in the tree representation 106 at a default labeling level relative to a number of levels of nodes in the tree representation 106, such as to prevent a situation in which too much information is presented at once in the tree representation 106. The user interface 102 can subsequently receive user inputs to change labeling, including to hide or show labels on presented nodes 114. The tree representation 106 can then be updated to adjust the labeling based on the received user input.

In some implementations, sub-nodes of a given node at a given level in the tree representation are not displayed but sub-node metadata is provided, the metadata including a number of sub-nodes for the given node. Subsequently, selection of the given node can cause presentation of the sub-nodes.

In some implementations, the tree representation 106, when initially presented, can include a level of detail that does not exceed a threshold complexity level, for example, a threshold indicating that no more than N levels are to be displayed or that no more than M nodes 114 are to be displayed. The tree representation 106, when initially presented, can include the current node-of-interest 118 and adjacent nodes 114, excluding excludable nodes 114 at the level of detail.

In some implementations, the tree representation 106 can be replaced with any of various types of other representations. For example, nodes 114 can be represented as a series of regions, sub-regions, and so on. In some implementations, the size or other visual appearance of specific regions can indicate various types of information, such as a hierarchical level within a tree or other structure, an amount of data or some other quantity associated with the region, or some other information. In some implementations, controls can be provided by which regions can be expanded to show sub-regions, or sub-regions associated with a region can be hidden.

At 206, a side panel is provided for display in a third area of the user interface and is presented simultaneously with the horizontal toolbar and the tree representation. For example, the user interface 102 includes the side panel 108. The side panel presents side panel entries corresponding to elements displayed in the hierarchical path and nodes displayed in the tree representation. For example, the side panel entries 120 correspond to nodes 114. The side panel identifies a currently-selected entry matching the currently-selected element in the horizontal toolbar and the current node-of-interest in the tree representation. For example, the currently-selected entry 122 that matches the currently-selected element 112 in the horizontal toolbar 104 and also matches the current node-of-interest 118 in the tree representation 106. From 206, method 200 proceeds to 208.

In some implementations, the side panel can present, such as for the currently-selected entry 122 and other displayed side panel entries 120, other information 124, such as including at least a title, a creation date-time, and a version. Other information can be presented, and other information can be accessible using drill-down or other features. Controls 125 can allow hierarchically-related side panel entries 120 to be hidden or exposed, as needed.

At 208, user inputs are received using the user interface. The user inputs are received within a currently-active area of the first area, the second area, and the third area. For example, user inputs can occur in any of the areas of the user interface 102, including any of the horizontal toolbar 104, the tree representation 106, and the side panel 108, depending on where the user is working. From 208, method 200 proceeds to 210.

At 210, based on the received user inputs, inactive areas of the first area, the second area, and the third area are automatically updated. For example, based on user selections on the horizontal toolbar 104, changes can occur regarding the nodes 114 that are displayed in the tree representation 106, and changes can occur regarding the presentation of side panel entries 120 in the side panel 108. From 210, method 200 stops.

In some implementations, the method 200 can further include receiving, when the currently-active area is the tree representation 106, user inputs to retain an active branch of the tree representation 106 and to hide selected branches of the tree representation 106. For example, using controls provided by the user interface 102, a selection can be made of a branch 126, including, Node 1 and the Node 1's sub-nodes. Upon selection of the branch 126, for example, the tree representation 106 can be re-presented, such as to exclude other nodes 114 from the display. In some implementations, the tree representation 106 can be updated to present an active branch of the tree representation, the active branch including the current node-of-interest 118. In some implementations, the method 200 can further include receiving user input to restore hidden branches of the tree representation 106. The tree representation 106 can then be updated to restore the hidden branches.

In some implementations, the method 200 can further include procedures to suspend updates to various areas in the user interface 102. For example, tools 128 can include tools used to prevent updates to the tree representation 106 from being propagated to other areas until the user decides that updates are to occur.

Figure 3:
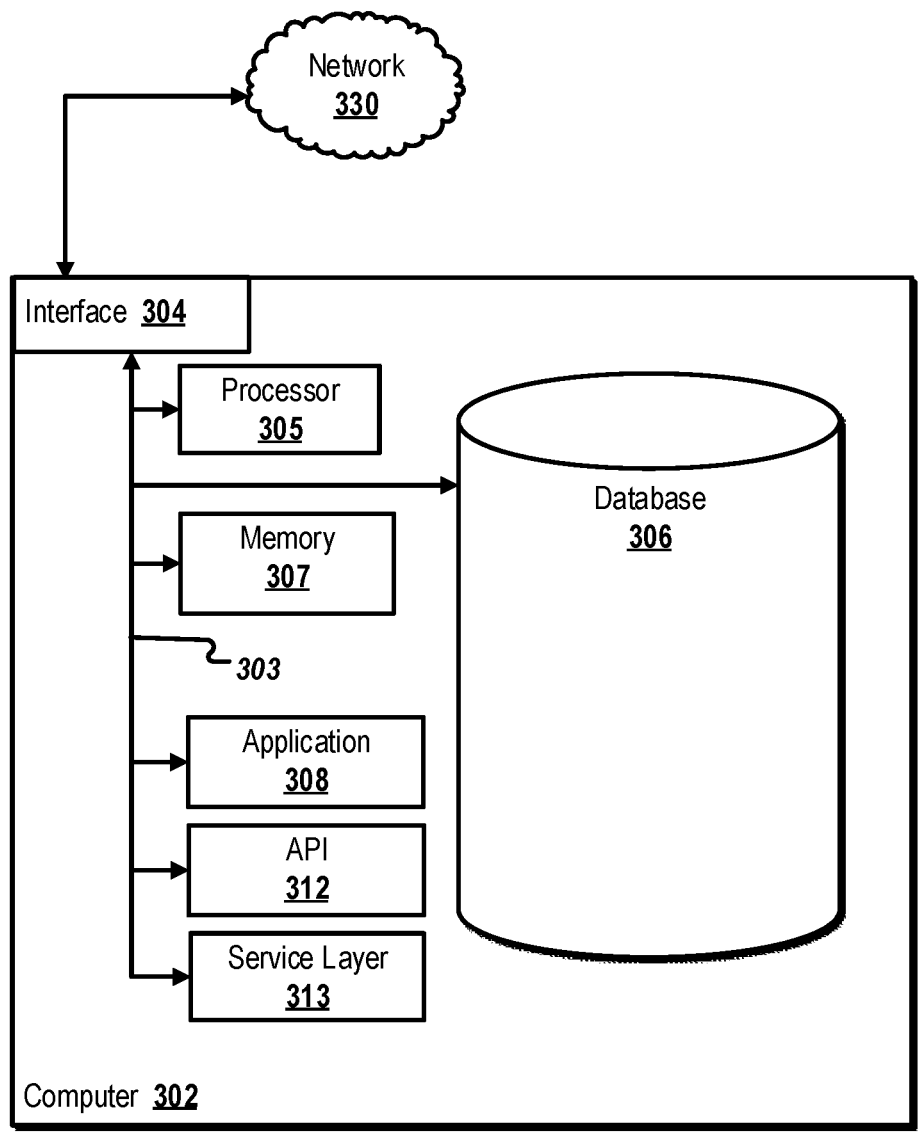
FIG. 3 is a block diagram illustrating an exemplary computer system used to provide computational functionalities associated with described algorithms, methods, functions, processes, flows, and procedures as described in the instant disclosure, according to an implementation.

FIG. 3 is a block diagram of an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications 308 on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method includes: providing, for display in a first area of a user interface, a horizontal toolbar presenting a hierarchical path terminating at a currently-selected element, the hierarchical path beginning at a root element and including intermediate elements from a hierarchically-related subset of elements related by parent-child relationships indicated in the hierarchical path using a left-to-right placement of adjacent parent and child elements; providing, for display in a second area of the user interface and presented simultaneously with the horizontal toolbar, a tree representation including nodes matching the elements included in the hierarchical path and including the currently-selected element, the tree representation using branches connecting adjacent parent-child nodes to indicate parent-child relationships, the tree representation highlighting a current node-of-interest in relation to other displayed nodes, the current node-of-interest matching the currently-selected element in the horizontal toolbar; providing, for display in a third area of the user interface and presented simultaneously with the horizontal toolbar and the tree representation, a side panel presenting side panel entries corresponding to elements displayed in the hierarchical path and nodes displayed in the tree representation, the side panel identifying a currently-selected entry matching the currently-selected element in the horizontal toolbar and the current node-of-interest in the tree representation; receiving, using the user interface, user inputs within a currently-active area of the first area, the second area, and the third area; and automatically updating, based on the received user inputs, inactive areas of the first area, the second area, and the third area.

The foregoing and other described implementations can each optionally include one or more of the following features:

A first feature, combinable with any of the following features, the computer-implemented method further includes identifying, using received horizontal toolbar inputs made using the horizontal toolbar, a selection of the currently-selected element, wherein the horizontal toolbar inputs include selecting a selected element at an existing level, the selected element being the currently-selected element.

A second feature, combinable with any of the previous or following features, the tree representation is, by default, a radial tree visualization, and the computer-implemented method of further includes: receiving a user input specifying a different tree representation selected from a group comprising a horizontal tree, a vertical tree, a tree map, or an icicle chart; and changing the tree representation to match the specified different tree representation.

A third feature, combinable with any of the previous or following features, the side panel presents, for the currently-selected entry and other displayed side panel entries, at least a title, a creation date-time, and a version.

A fourth feature, combinable with any of the previous or following features, nodes presented in the tree representation are displayed using different node representations for different levels.

A fifth feature, combinable with any of the previous or following features, the computer-implemented method further includes: labeling nodes in the tree representation at a default labeling level relative to a number of levels of nodes in the tree representation; receiving user input to change labeling; and updating the tree representation to adjust the labeling based on the received user input A sixth feature, combinable with any of the previous or following features, the computer-implemented method further includes: receiving, when the currently-active area is the first area, user inputs to retain the active branch of the tree representation and to hide selected branches of the tree representation; and updating the tree representation to present an active branch of the tree representation, the active branch including the current node-of-interest.

A seventh feature, combinable with any of the previous or following features, the computer-implemented method further includes: receiving user input to restore hidden branches of the tree representation; and updating the tree representation to restore the hidden branches.

An eighth feature, combinable with any of the previous or following features, sub-nodes of a given nodes at a given level in the tree representation are not displayed but sub-node metadata is provided, the metadata including a number of sub-nodes for the given node, and wherein selection of the given node presents the sub-nodes.

A ninth feature, combinable with any of the previous or following features, the computer-implemented method further includes: limiting updates receiving, using the user interface, user inputs within a currently-active area of the first area, the second area, and the third area.

A tenth feature, combinable with any of the previous or following features, the tree representation, when initially presented: includes a level of detail not exceeding a threshold complexity level; includes the current node-of-interest and adjacent nodes; and excludes excludable nodes at the level of detail.

In a second implementation, a non-transitory, computer-readable medium stores one or more instructions executable by a computer system to perform operations comprising: providing, for display in a first area of a user interface, a horizontal toolbar presenting a hierarchical path terminating at a currently-selected element, the hierarchical path beginning at a root element and including intermediate elements from a hierarchically-related subset of elements related by parent-child relationships indicated in the hierarchical path using a left-to-right placement of adjacent parent and child elements; providing, for display in a second area of the user interface and presented simultaneously with the horizontal toolbar, a tree representation including nodes matching the elements included in the hierarchical path and including the currently-selected element, the tree representation using branches connecting adjacent parent-child nodes to indicate parent-child relationships, the tree representation highlighting a current node-of-interest in relation to other displayed nodes, the current node-of-interest matching the currently-selected element in the horizontal toolbar; providing, for display in a third area of the user interface and presented simultaneously with the horizontal toolbar and the tree representation, a side panel presenting side panel entries corresponding to elements displayed in the hierarchical path and nodes displayed in the tree representation, the side panel identifying a currently-selected entry matching the currently-selected element in the horizontal toolbar and the current node-of-interest in the tree representation; receiving, using the user interface, user inputs within a currently-active area of the first area, the second area, and the third area; and automatically updating, based on the received user inputs, inactive areas of the first area, the second area, and the third area.

The foregoing and other described implementations can each optionally include one or more of the following features:

A first feature, combinable with any of the following features, the operations further include identifying, using received horizontal toolbar inputs made using the horizontal toolbar, a selection of the currently-selected element, wherein the horizontal toolbar inputs include selecting a selected element at an existing level, the selected element being the currently-selected element.

A second feature, combinable with any of the previous or following features, the tree representation is, by default, a radial tree visualization, and the computer-implemented method of further includes: receiving a user input specifying a different tree representation selected from a group comprising a horizontal tree, a vertical tree, a tree map, or an icicle chart; and changing the tree representation to match the specified different tree representation.

A third feature, combinable with any of the previous or following features, the side panel presents, for the currently-selected entry and other displayed side panel entries, at least a title, a creation date-time, and a version.

A fourth feature, combinable with any of the previous or following features, nodes presented in the tree representation are displayed using different node representations for different levels.

In a third implementation, a computer-implemented system comprises a computer memory and a hardware processor interoperably coupled with the computer memory and configured to perform operations comprising providing, for display in a first area of a user interface, a horizontal toolbar presenting a hierarchical path terminating at a currently-selected element, the hierarchical path beginning at a root element and including intermediate elements from a hierarchically-related subset of elements related by parent-child relationships indicated in the hierarchical path using a left-to-right placement of adjacent parent and child elements; providing, for display in a second area of the user interface and presented simultaneously with the horizontal toolbar, a tree representation including nodes matching the elements included in the hierarchical path and including the currently-selected element, the tree representation using branches connecting adjacent parent-child nodes to indicate parent-child relationships, the tree representation highlighting a current node-of-interest in relation to other displayed nodes, the current node-of-interest matching the currently-selected element in the horizontal toolbar; providing, for display in a third area of the user interface and presented simultaneously with the horizontal toolbar and the tree representation, a side panel presenting side panel entries corresponding to elements displayed in the hierarchical path and nodes displayed in the tree representation, the side panel identifying a currently-selected entry matching the currently-selected element in the horizontal toolbar and the current node-of-interest in the tree representation; receiving, using the user interface, user inputs within a currently-active area of the first area, the second area, and the third area; and automatically updating, based on the received user inputs, inactive areas of the first area, the second area, and the third area.

The foregoing and other described implementations can each optionally include one or more of the following features:

A first feature, combinable with any of the following features, the operations further include identifying, using received horizontal toolbar inputs made using the horizontal toolbar, a selection of the currently-selected element, wherein the horizontal toolbar inputs include selecting a selected element at an existing level, the selected element being the currently-selected element.

A second feature, combinable with any of the previous or following features, the tree representation is, by default, a radial tree visualization, and the computer-implemented method of further includes: receiving a user input specifying a different tree representation selected from a group comprising a horizontal tree, a vertical tree, a tree map, or an icicle chart; and changing the tree representation to match the specified different tree representation.

A third feature, combinable with any of the previous or following features, the side panel presents, for the currently-selected entry and other displayed side panel entries, at least a title, a creation date-time, and a version.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    providing, for display in a first area of a user interface, a horizontal toolbar presenting a hierarchical path terminating at a currently-selected element, the hierarchical path beginning at a root element and including intermediate elements from a hierarchically-related subset of elements related by parent-child relationships indicated in the hierarchical path using a left-to-right placement of adjacent parent and child elements;
    providing, for display in a second area of the user interface and presented simultaneously with the horizontal toolbar, a tree representation including nodes matching the elements included in the hierarchical path and including the currently-selected element, the tree representation using branches connecting adjacent parent-child nodes to indicate parent-child relationships, the tree representation highlighting a current node-of-interest in relation to other displayed nodes, the current node-of-interest matching the currently-selected element in the horizontal toolbar;
    providing, for display in a third area of the user interface and presented simultaneously with the horizontal toolbar and the tree representation, a side panel presenting side panel entries corresponding to elements displayed in the hierarchical path and nodes displayed in the tree representation, the side panel identifying a currently-selected entry matching the currently-selected element in the horizontal toolbar and the current node-of-interest in the tree representation;
    receiving, using the user interface, user inputs within a currently-active area of the first area, the second area, and the third area; and
    automatically updating, based on the received user inputs, inactive areas of the first area, the second area, and the third area.

2. The computer-implemented method of claim 1, further comprising identifying, using received horizontal toolbar inputs made using the horizontal toolbar, a selection of the currently-selected element, wherein the horizontal toolbar inputs include selecting a selected element at an existing level, the selected element being the currently-selected element.

3. The computer-implemented method of claim 1, wherein the tree representation is, by default, a radial tree visualization, the computer-implemented method further comprising:
    receiving a user input specifying a different tree representation selected from a group comprising a horizontal tree, a vertical tree, a tree map, or an icicle chart; and
    changing the tree representation to match the specified different tree representation.

4. The computer-implemented method of claim 1, wherein the side panel presents, for the currently-selected entry and other displayed side panel entries, at least a title, a creation date-time, and a version.

5. The computer-implemented method of claim 1, wherein nodes presented in the tree representation are displayed using different node representations for different levels.

6. The computer-implemented method of claim 1, further comprising:
   labeling nodes in the tree representation at a default labeling level relative to a number of levels of nodes in the tree representation;
   receiving user input to change labeling; and
   updating the tree representation to adjust the labeling based on the received user input.

7. The computer-implemented method of claim 1, further comprising:
   receiving, when the currently-active area is the first area, user inputs to retain the active branch of the tree representation and to hide selected branches of the tree representation; and
   updating the tree representation to present an active branch of the tree representation, the active branch including the current node-of-interest.

8. The computer-implemented method of claim 7, further comprising:
   receiving user input to restore hidden branches of the tree representation; and
   updating the tree representation to restore the hidden branches.

9. The computer-implemented method of claim 1, wherein sub-nodes of a given nodes at a given level in the tree representation are not displayed but sub-node metadata is provided, the metadata including a number of sub-nodes for the given node, and wherein selection of the given node presents the sub-nodes.

10. The computer-implemented method of claim 1, further comprising:
    limiting updates receiving, using the user interface, user inputs within a currently-active area of the first area, the second area, and the third area.

11. The computer-implemented method of claim 1, wherein the tree representation, when initially presented:
    includes a level of detail not exceeding a threshold complexity level;
    includes the current node-of-interest and adjacent nodes; and
    excludes excludable nodes at the level of detail.

12. A non-transitory, computer-readable medium storing one or more instructions executable by a computer system to perform operations comprising:
    providing, for display in a first area of a user interface, a horizontal toolbar presenting a hierarchical path terminating at a currently-selected element, the hierarchical path beginning at a root element and including intermediate elements from a hierarchically-related subset of elements related by parent-child relationships indicated in the hierarchical path using a left-to-right placement of adjacent parent and child elements;
    providing, for display in a second area of the user interface and presented simultaneously with the horizontal toolbar, a tree representation including nodes matching the elements included in the hierarchical path and including the currently-selected element, the tree representation using branches connecting adjacent parent-child nodes to indicate parent-child relationships, the tree representation highlighting a current node-of-interest in relation to other displayed nodes, the current node-of-interest matching the currently-selected element in the horizontal toolbar;
    providing, for display in a third area of the user interface and presented simultaneously with the horizontal toolbar and the tree representation, a side panel presenting side panel entries corresponding to elements displayed in the hierarchical path and nodes displayed in the tree representation, the side panel identifying a currently-selected entry matching the currently-selected element in the horizontal toolbar and the current node-of-interest in the tree representation;
    receiving, using the user interface, user inputs within a currently-active area of the first area, the second area, and the third area; and
    automatically updating, based on the received user inputs, inactive areas of the first area, the second area, and the third area.

13. The non-transitory, computer-readable medium of claim 12, the operations further comprising identifying, using received horizontal toolbar inputs made using the horizontal toolbar, a selection of the currently-selected element, wherein the horizontal toolbar inputs include selecting a selected element at an existing level, the selected element being the currently-selected element.

14. The non-transitory, computer-readable medium of claim 12, wherein the tree representation is, by default, a radial tree visualization, the method of Claim further comprising:
    receiving a user input specifying a different tree representation selected from a group comprising a horizontal tree, a vertical tree, a tree map, or an icicle chart; and
    changing the tree representation to match the specified different tree representation.

15. The non-transitory, computer-readable medium of claim 12, wherein the side panel presents, for the currently-selected entry and other displayed side panel entries, at least a title, a creation date-time, and a version.

16. The non-transitory, computer-readable medium of claim 12, wherein nodes presented in the tree representation are displayed using different node representations for different levels.

17. A computer-implemented system, comprising:
    a computer memory; and
    a hardware processor interoperably coupled with the computer memory and configured to perform operations comprising:
    providing, for display in a first area of a user interface, a horizontal toolbar presenting a hierarchical path terminating at a currently-selected element, the hierarchical path beginning at a root element and including intermediate elements from a hierarchically-related subset of elements related by parent-child relationships indicated in the hierarchical path using a left-to-right placement of adjacent parent and child elements;
    providing, for display in a second area of the user interface and presented simultaneously with the horizontal toolbar, a tree representation including nodes matching the elements included in the hierarchical path and including the currently-selected element, the tree representation using branches connecting adjacent parent-child nodes to indicate parent-child relationships, the tree representation highlighting a current node-of-interest in relation to other displayed nodes, the current node-of-interest matching the currently-selected element in the horizontal toolbar;

providing, for display in a third area of the user interface and presented simultaneously with the horizontal toolbar and the tree representation, a side panel presenting side panel entries corresponding to elements displayed in the hierarchical path and nodes displayed in the tree representation, the side panel identifying a currently-selected entry matching the currently-selected element in the horizontal toolbar and the current node-of-interest in the tree representation;

receiving, using the user interface, user inputs within a currently-active area of the first area, the second area, and the third area; and automatically updating, based on the received user inputs, inactive areas of the first area, the second area, and the third area.

18. The computer-implemented system of claim 17, the operations further comprising identifying, using received horizontal toolbar inputs made using the horizontal toolbar, a selection of the currently-selected element, wherein the horizontal toolbar inputs include selecting a selected element at an existing level, the selected element being the currently-selected element.

19. The computer-implemented system of claim 17, wherein the tree representation is, by default, a radial tree visualization, the method of Claim further comprising:

receiving a user input specifying a different tree representation selected from a group comprising a horizontal tree, a vertical tree, a tree map, or an icicle chart; and changing the tree representation to match the specified different tree representation.

20. The computer-implemented system of claim 17, wherein the side panel presents, for the currently-selected entry and other displayed side panel entries, at least a title, a creation date-time, and a version.

* * * * *